Figure 1:
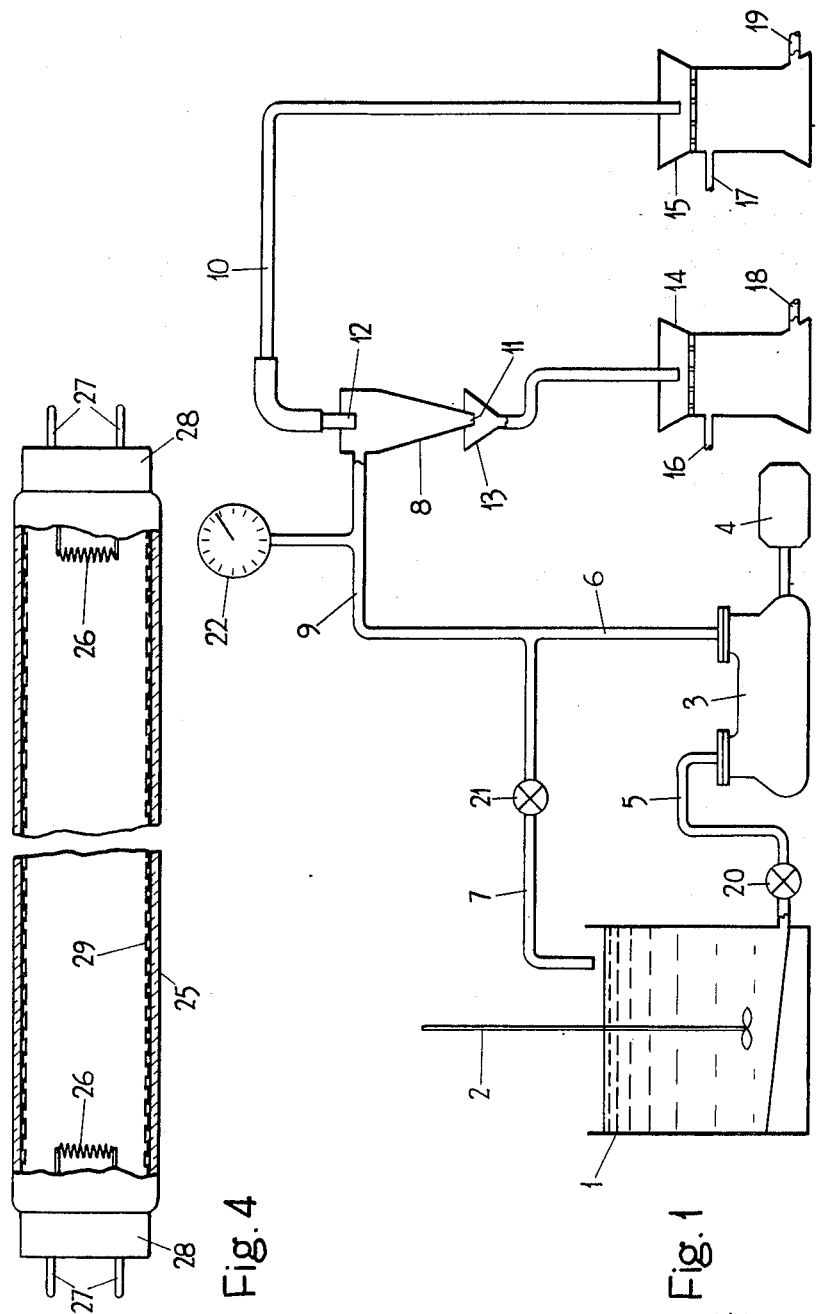

3,242,369
FLUORESCENT LAMP WITH A PHOSPHOR COATING OF PLATELIKE CRYSTALS
William Godfrey King, Greenford, Christopher Robin John Leete, Stanmore, and Alfred Hamilton McKeag, Wembley, England, assignors to The General Electric Company Limited, London, England, a British company
Filed Apr. 3, 1961, Ser. No. 100,410
Claims priority, application Great Britain, Apr. 7, 1960, 12,395/60
5 Claims. (Cl. 313—109)

This invention relates to phosphors and their manufacture, and is more particularly concerned with a novel form of halophosphate phosphors and a method of manufacturing halophosphate phospors by which these phosphors can be obtained in the said novel form. The invention also relates to electric discharge lamps incorporating the phosphors.

Halophosphate phosphors, as is well known, are artificial crystalline materials having the apatite type of crystal structure and consisting essentially of substances having the general formula $3M_3(PO_4)_2.1M^1L_2$ (wherein M and $M^1$, which may be the same or different, are each one or more of the alkaline earth metals calcium, strontium, barium, and L is a halogen or mixture of halogens), activated so as to be excitable to luminescence by ultra violet radiation of wavelength 2537 A.: metals which have been proposed for use as activators include antimony, tin, lead and bismuth, and manganese may also be employed as a secondary activator. These phosphors find wide application in low pressure mercury vapour electric discharge lamps for coating the interior surface of the discharge envelope.

A halophosphate phosphor is usually prepared by heating a powdered mixture of a phosphate or phosphates of the metal or metals M, the required halide or halides of the metal or metals $M^1$, and a suitable compound or compounds of the activator metal or metals; if the phosphate of M employed is less basic than the orthophosphate, any necessary additional proportion of the metal or metals M may be provided by including in the initial mixture another suitable compound of M, such as the carbonate, which decomposes on heating to give the metallic oxide.

The phosphate employed in the above-described process is usually obtained by precipitation, for example by mixing together aqueous solutions of ammonium phosphate and of the chloride or chlorides of the metal or metals M. The production of the phosphate has been carried out hitherto on the commercial scale by continuously feeding streams of the respective solutions, of relatively high concentrations, simultaneously into a mixing chamber, allowing the overflow liquid containing the precipitate to pass through a filter, and washing and drying the precipitate.

Halophosphate phosphors produced by the known process described above are obtained in the form of a mass of irregularly shaped crystals which are substantially equant, that is to say of a thickness which is of the same order as the length and breadth.

We have now discovered that halophosphate phosphors can be produced in a novel form, which may be used to secure certain advantages as compared with the known form; we have also discovered a method of manufacturing halophosphate phosphors, by which they can be obtained in the said novel form.

According to the first aspect of the invention, a halophosphate phosphor is composed substantially wholly of plate-like crystals, that is to say of crystals having one dimension which is considerably smaller than each of the other two dimensions at right angles thereto.

According to the second aspect of the invention, a method of manufacturing a halophosphate phosphor consisting of a halophosphate of the general formula $3M_3(PO_4)_2.1M^1L_2$ as hereinbefore defined, and one or more activator metals, includes the steps of precipitating a phosphate or phosphates of the metal or metals M by mixing a aqueous solution of ammonium phosphate with a dilute aqueous solution of a water-soluble salt or salts of the metal or metals M of a concentration not greater than 1.5 moles per litre of the solution, the concentrations of the respective solutions being such that the concentration of the mixed solution is also not greater than 1.5 moles per litre of the solution and the mixing being carried out with continuous stirring, filtering the suspension of alkaline earth metal phosphate precipitate so formed, washing and drying the precipitate, mixing the dried precipitate with a halide or halides $M^1L_2$ and if desired a compound or compounds of the metal or metals M decomposable to give the oxide or oxides of the metal or metals M on heating, in the proportions required to give the halophosphate composition, together with a compound or compounds of the desired activator metal or metals, and heating the mixture so as to produce the activated halophosphate phosphor.

The concentration of the dilute solution of the salt or salts of M initially employed, and the concentration of the mixed solution produced on mixing the ammonium phosphate solution therewith, are each preferably less than 0.5 mole per litre of the solution. The ammonium phosphate solution used is conveniently of a similar concentration to that of the solution of the salt or salts of M: the respective solutions can then be used in substantially equal volumes, to give a final mixed solution of the required low concentration.

The metals M and $M^1$ may each consist of one or more of the alkaline earth metals calcium, strontium, barium, and may be the same or different alkaline earth metals. The salt or salts of the alkaline earth metal or metals employed in the dilute aqueous solution which is mixed with the ammonium phosphate solution, for the precipitation of the phosphate or phosphates, may suitably be the chloride or chlorides. The precipitation may conveniently be carried out at room temperature.

We have found that precipitation of the phosphate or phosphates of the metal or metals M under the conditions specified above, that is to say in dilute solution, results in the production of the phosphate or phosphates of M in the form of plate-like crystals which are very much smaller in one dimension than in either of the other two dimensions.

Thus the use of dilute solutions, of concentrations preferably of the order of molar or half-molar, favours the production of thin, well-formed plate-like crystals, overgrowth of the crystals on one another being substantially prevented. The production of well-formed crystals is also promoted by relatively slow mixing, vigorous mechanical stirring tending to break up the plate-like crystals. We have further found that the halophosphate phosphor formed from such phosphate crystals also consists of plate-like crystals, retaining substantially the shape of the crystals of the phosphate starting material.

The mixing of the ammonium phophate solution with the solution of the salt or salts of the metal or metals M, for precipitating the phosphate or phosphates of M, is preferably effected by adding the ammonium phosphate solution to the M salt solution, for a batch process, or a continuous process may be carried out by continuously mixing two streams of the respective solutions, the rates of flow of the solution being controlled so that the amounts of ammonium phosphate and M salt mixed together are maintained substantially chemically equivalent to one another and the concentration of the mixed solution is maintained at the required low value, as specified above.

The phosphor forming method of the invention preferably includes the step of passing the aqueous suspension of the phosphate precipitate through a hydro-cyclone under pressure, prior to filtering of the suspension. By the term "hydro-cyclone" is meant a separator of the type consisting of a cylindro-conical vessel disposed vertically with the wider end uppermost, provided with a small conical nozzle at the apex of the cone, an inlet tube at the side, disposed tangentially at the widest part of the vessel, and an outlet tube, referred to as the "vortex finder," fitted into the top of the vessel and projecting a short distance into the conical body of the vessel, along the axis of the cone. When a suspension of powder in a liquid is passed through the inlet tube into the body of the hydro-cyclone, under pressure, a spiralling motion of the suspension is set up and a double vortex is formed, the suspension first travelling downwards and part of it (the underflow) flowing out through the apex of the cyclone, while part of the suspension (the overflow) travels upwards in an inner vortex in the region of the axis of the cone, to be discharged through the vortex finder: in general the coarser particles of the suspension emerge from the apex of the cyclone, while the finer particles are carried upwards to the vortex finder, so that a hydro-cyclone can be used for classification of a powder.

We have found that if the suspension of the phosphate precipitate produced in accordance with the invention is passed through a hydro-cyclone, improved dispersion of the precipitate is obtained, by virtue of the vigorous shearing action of the double vortex, so that any tendency of the plate-like crystals of the precipitate to form aggregates is reduced and the uniformity of size of the crystals is improved. If the precipitation of the phosphate is effected by mixing the ammonium phosphate solution and the M salt solution continuously, the required stirring of the mixed solution and the suspension may be effected entirely by the vortex action of the cyclone, no additional stirring prior to the introduction of the suspension into the cyclone being necessary. Thus the two solutions may be fed simultaneously into the inlet tube of the cyclone, so that precipitation occurs immediately before the mixed solution, containing the precipitate in suspension, enters the cyclone, the suspension being subjected to the double vortex action of the cyclone without any preliminary stirring. The more vigorous stirring action obtained in the cyclone, as compared with slow mechanical stirring in a mixing tank, does not tend to break up the plate-like crystals since the latter are not subjected to any mechanical action in the cyclone.

Some degree of classification of the precipitate may be achived during the passage of the suspension through the cyclone, but in the present case this function of the cyclone is not of great importance, since the crystals precipitated under the conditions of the method of the invention substantially all lie within a relatively small size range: we have found little difference in particle size between the two fractions of the precipitate emerging respectively from the apex and the vortex finder of the cyclone. This substantial uniformity of particle size appears to be due to the use of dilute solutions, as specified.

On completion of the precipitation of the phosphate or, in the preferred method of the invention, after the suspension has been passed through a hydrocyclone, the precipitate is collected on a filter, washed with water, and dried. The dried phosphate precipitate is in a bulky form and is readily pulverised by light crushing, giving a finely-divided crystalline powder, the size of the plate-like crystalline particles usually being of the order of 1 to 5 microns, expressed as a mean spherical diameter, derived from surface area measurement by the Carman Air Permeability Apparatus.

The remaining steps in the manufacture of the halophosphate phosphor, comprising mixing the dried and crushed phosphate precipitate with a halide or halides $M^1L_2$, an additional decomposable compound of M if required, and a compound or compounds of the desired activator metal or metals, all in powder form, heating the mixture and pulverising the product of the heating, may be carried out in known manner.

It is to be understood that the materials used in the manufacture of a phosphor by the method of the invention should all be of high purity, as is usual in the manufacture of luminescent materials.

According to the third aspect of the invention, in a low pressure mercury vapour fluorescent electric discharge lamp in which the interior surface of the discharge envelope is coated with halophosphate phosphor crystals, these crystals are wholly or mainly of a plate-like form, at least the majority of the crystals are arranged with their larger dimensions substantially parallel to the surface of the discharge envelope, and the overall coating thickness is such that substantially all of the 2537 A. radiation incident on the coating in operation of the lamp is absorbed in the coating.

The phosphor coating should not be thicker than necessary for the absorption of the 2537 A. radiation, and a coating thickness of about 2 or 3 microns will in general be sufficient.

The novel shape of the crystals in halophosphate phosphor powders in accordance with the present invention enables certain advantages to be obtained, as compared with such phosphors in the form produced by prior methods, when used for coating the envelope of a fluorescent lamp, these advantages arising directly from the plate-like shape of the crystals. Thus, when the phosphor of the invention is applied to a glass surface, such as the interior wall of a tubular discharge lamp envelope, by flushing the surface with a suspension of the phosphor powder, the plate-like crystals will tend to be laid substantially flat on the glass surface: this results in improved adhesivity of the coating to the glass surface by virtue of the greater area of contact of each phosphor particle with the surface. Moreover with such an arrangement of the plate-like crystals the phosphor coating needed to ensure complete coverage of the glass surface will be thinner than that required with phosphor powders of the known form: as indicated above, the coating need only be thick enough to ensure complete absorption of the ultra violet radiation from the mercury discharge. A thinner coating results in a reduced light absorption, and less optical scattering within the phosphor layer, with resulting increase in the overall efficiency of the lamp. A further advantage to which the increased covering power of the plate-like crystals can give rise is that of economy, since a relatively low weight of phosphor per unit area of the glass surface will be required, so that the total amount of phosphor required to coat a lamp envelope will be reduced.

The manufacture of a halophosphate phosphor by a specific method in accordance with the invention, which we have carried out, will now be described by way of example.

The phosphor produced by the method of the example was calcium strontium chloro-fluorophosphate of composition $3Cr_3(PO4)_2.0.82CaF_2.0.18SrCl_2$, activated by antimony and manganese.

For the precipitation of calcium phosphate, aqueous solutions of calcium chloride and ammonium phosphate were first prepared. The calcium chloride solution was prepared by dissolving 5.1 kg. of a grade of flake calcium chloride containing 71% $CaCl_2$ (the remainder being mainly water with a small amount of insoluble impurities) in 21.6 litres of demineralised water, allowing the solution to stand overnight and then pumping it through a ceramic filter to remove insoluble matter: the resulting solution had a pH value of 9.7 and specific gravity 1.120 at 20° C.

The ammonium phosphate solution was prepared by dissolving 4.73 kg. of diammonium hydrogen phosphate, $(NH_4)_2HPO_4$, of a high purity grade in 20.9 litres of demineralised water, allowing the solution to stand overnight and then pumping it through a ceramic filter. 0.7 litre of concentrated hydrochloric acid was added, giving a solution of pH 6.6 and specific gravity 1.110 at 20° C.

The production of the crystalline calcium phosphate precipitate was carried out in apparatus of the form shown diagrammatically in FIGURE 1 of the accompanying drawings.

Referring to FIGURE 1, the apparatus comprises a mixing tank 1 fitted with a slow speed stirrer 2, a pump 3 driven by a motor 4 and connected to the tank 1 by a pipe 5, and, connected to the pump 3 by a pipe 6 fitted with a by-pass pipe 7, a hydrocyclone 8 provided with an inlet tube 9 directly connected to the pipe 6, an overflow outlet tube 10, and underflow outlet at the apex 11, and a vortex finder 12 forming the inner end of the outlet tube 10. A funnel 13 is disposed beneath the apex 11 to receive the underflow therefrom and discharge it into a filter 14, which is provided with a vacuum pipe 16 and a liquid outlet pipe 18. A second filter, 15, provided with a vacuum pipe 17 and a liquid outlet pipe 19, is arranged to receive the overflow discharged from the cyclone outlet tube 10.

A hydro-cyclone of a suitable size for use in the preparation of the calcium phosphate precipitate is one having a top diameter of 60 mm., an apex diameter of 2 mm., and a length of 344 mm., with an inlet tube of diameter 9 mm. and a vortex finder of diameter 12 mm.

Valves 20 and 21 are provided in the pipes 5 and 7 respectively, for controlling the rate of flow of the phosphate suspension into the hydro-cyclone, and a pressure gauge 22 is fitted to the hydro-cyclone inlet tube 9.

To prepare the calcium phosphate, using the above-described apparatus, 5 litres of the calcium chloride solution, prepared as described above, were added to 40 litres of demineralised water contained in the mixing tank 1, the solution being mixed thoroughly, and 5 litres of the ammonium phosphate solution were then added to the dilute calcium chloride solution in a period of about two minutes with continuous stirring, to precipitate calcium hydrogen phosphate, $CaHPO_4$, and the stirring was continued for a further five minutes.

The resulting suspension of precipitated calcium hydrogen phosphate was pumped from the tank 1 up the pipe 6 and thence through the cyclone 8 through the inlet tube 9, at a rate of about 25 litres per minute and under a pressure of 20 lbs./sq. in., the rate of flow of the suspension being adjusted as necessary by operation of the valve 21, which enabled excess suspension to be run back into the tank 1 through the pipe 7. Within the cyclone separation of the suspension into two fractions took place, in the manner described above, and the underflow and overflow fractions of the suspension were discharged respectively through the apex 11 and the outlet tube 10, and collected respectively in the vacuum filters 14 and 15. The fractions of the precipitate retained on the filters were each washed with 20 litres of demineralised water, as much of the water as possible being removed by the vacuum, and were finally dried in an oven at 100° C. for 15 hours, and pulverised by light crushing.

The yields of the respective precipitates from the underflow and overflow were in the ratio of 40%:60% by weight and were of similar particle size, namely approximately two microns means spherical diameter as derived from surface area measurements by the Carman air permeability apparatus, the particles consisting of plate-like crystals.

Batches of the crystalline $CaHPO_4$ powder from the underflow and overflow fractions were used separately for preparing batches of the halophosphate phosphor. In each case the mixture of starting materials for the phosphor had the following composition:

|  | G. |
|---|---|
| $CaHPO_4$ | 163.2 |
| Calcium carbonate ($CaCO_3$) | 54 |
| Calcium fluoride ($CaF_2$) | 12.8 |
| Strontium chloride ($SrCl_2$) | 5.8 |
| Manganese ammonium phosphate ($Mn(NH_4)PO_4$) | 4.8 |
| Antimony trioxide ($Sb_2O_3$) | 4.1 |

This mixture was blended thoroughly and was then passed through a 50 mesh silk sieve. The sieved powder was fired in a silica crucible, with a closely fitting lid, at 1180° C. for 1½ hours. After this treatment, the powder was not sintered appreciably and required no grinding. It was sieved through a 150 mesh silk screen.

The bulk density of the halophosphate phosphor powder, produced by the method of the example, was about half that of powder of similar composition prepared from $CaHPO_4$ precipitated by the continuous process employed hitherto, and had a more lustrous surface sheen. The powder of the example was particularly distinguished from the known powder by its plate-like crystal shape, contrasting with the thicker and more equant particles of the known powder. The batches of phosphor powder in accordance with the invention prepared from the two separate fractions of the $CaHPO_4$ precipitate differed little from one another in physical characteristics, and both batches were similar in body colour and in brightness of luminescence to a similar phosphor prepared from continuously precipitated $CaHPO_4$.

The mehtod and apparatus described in the above example, may, with some simple modifications, be adapted to a continuous process for producing the phosphate precipitate. Thus the calcium chloride solution and the ammonium phosphate solution, prepared as described above, may each be contained in a separate tank, each tank being provided with an arrangement for pumping the liquid into the cyclone and controlling the rate of flow of the liquid through the cyclone. The solutions are then pumped simultaneously into the cyclone, for example at the rate of 20 litres per minute for each solution, the arrangement being such that the two solutions meet and mix in the inlet tube of the cyclone, so that precipitation takes place just before the mixture enters the cyclone, and stirring of the resulting phosphate suspension is effected by the action of the cyclone. The remainder of the process of preparing the halophosphate phosphor is then carried out in the manner described in the example.

Figure 2:
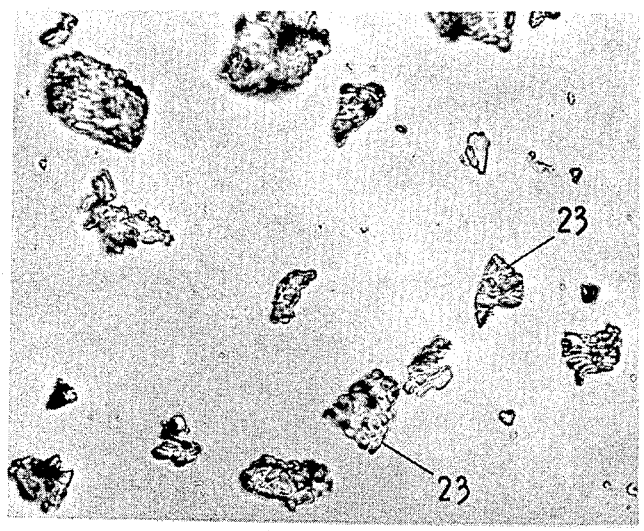
Figure 3:
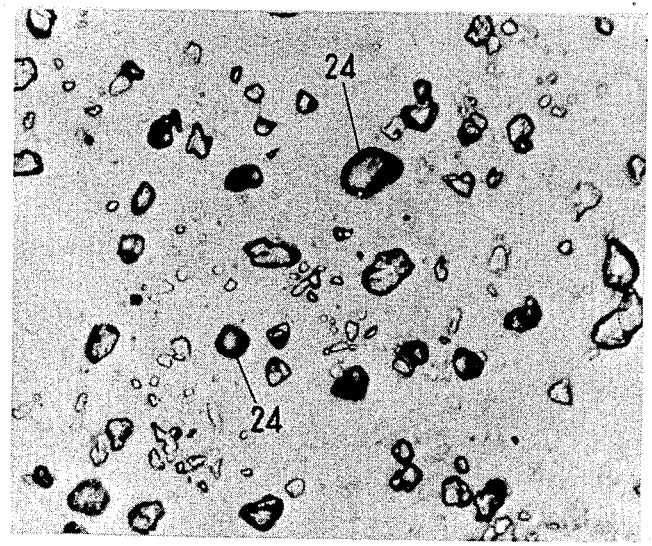

The crystalline form of halophosphate phosphor in accordance with the invention is illustrated in FIGURE 2 of the accompanying drawings, which is a photomicrograph of a typical sample of the phosphor prepared by the method described in the above example; FIGURE 3 is a photomicrograph, included for comparison, of a typical sample of phosphor of the same composition but prepared by the method usually employed hitherto, involving precipitation of the calcium phosphate by feeding relatively concentrated solutions of calcium chloride and ammonium phosphate simultaneously into a mixing vessel. The ranges of sizes of the particles in the two photographs are in fact similar, the particles in FIGURE 2 appearing larger because they are of plate-like form and lie on the slide on which they were mounted their larger dimensions substantially parallel with the surface of the slide, whereas the particles in FIGURE 3 are more nearly equidimensional. The differences in thickness of the particles of the two samples can be seen in the photographs: thus the sharply focused edges of the crystals shown in FIGURE 2, as indicated for example at 23, show that the crystals are extremely thin, while the somewhat blurred and apparently rounded edges of the crystals in FIGURE 3, as indicated for example at 24, show that these crystals are considerably thicker than those in FIGURE 2.

A low pressure mercury vapour fluorescent electric discharge lamp incorporating a phosphor in accordance with the invenion is shown, in a part-sectional view, in FIGURE 4 of the accompanying drawings. The lamp comprises a tubular glass envelope, 25, which a conventional electrode 26 mounted in each end and connected to the terminals 27 in the end caps 28. A halophosphate phosphor composed of plate-like crystals, in accordance with the invention, is deposited upon the interior surface of the tubular envelope by the well known method of causing a suspension of the phosphor powder to flow through the envelope and draining out the excess suspension, followed by a baking treatment, to form a thin coating, 29, of the phosphor in which the plate-like particles lie with their larger dimensions substantially parallel to the surface of the envelope.

If desired, a halophosphate phosphor composed of plate-like crystals, in accordance with the present invention, may be mixed with a minor proportion of halophosphate phosphor powder of the known form, consisting of substantially equant crystals, particularly with a halophosphate phosphor powder obtained by a classification process, with eliminates the ultra fine and extra large particles. The use of such a mixture might be advantageous for enabling consumption of the classified phosphor to be reduced. It is to be understood that such mixed phosphors, and devices including luminescent screens formed of such mixtures, are also included within the scope of the invention.

It will be understood that, although in this specification reference has been made to the use of the phosphors of the invention only in low pressure mercury vapour fluorescent electric discharge devices, these phosphors can also be used in other electric discharge devices for which halophosphate phosphors are suitable, for example in cathode ray tubes.

We claim:

1. In a low pressure mercury vapour fluorescent electric discharge lamp having a discharge envelope, a coating on the interior surface of said envelope which coating constitutes halophosphate phosphor crystals which are substantially wholly of a plate-like form, the thickness of said crystals being small and their other dimensions being considerably larger, and wherein at least the majority of the said crystals are arranged with their larger dimensions substantially parallel to the surface of the discharge envelope, and the over-all coating thickness on said surface is such that substantially all of the 2537 A. radiation incident on the coating in operation of the lamp is absorbed in the coating.

2. A coating according to claim 1, wherein the thickness of the phosphor coating is only that which is sufficient for the absorption of the 2537 A. radiation.

3. In a low pressure mercury vapour fluorescent electric discharge lamp having a discharge envelope, a coating on the interior surface of said envelope which coating consists of a substantially uniform mixture composed of a major proportion of halophosphate crystals of a plate-like form, the thickness of said crystals being small and their other dimensions being considerably larger, and a minor proportion of substantially equant halophosphate crystals.

4. A coating according to claim 3 wherein at least the majority of the halophosphate crystals of plate-like form are arranged with their larger dimensions substantially parallel to the surface of the discharge envelope and wherein the over-all coating thickness on said surface is such that substantially all of the 2537 A. radiation incident on the coating in operation of the lamp is absorbed in the coating.

5. A coating as set forth in claim 4 wherein the thickness of the phosphor coating is only that which is sufficient for the absorption of the 2537 A. radiation.

References Cited by the Examiner

UNITED STATES PATENTS

| | | | |
|---|---|---|---|
| 2,814,748 | 11/1957 | Cox | 313—109 |
| 2,965,786 | 12/1960 | Aia et al. | 313—109 |
| 2,987,414 | 6/1961 | Martyny | 117—33.5 |
| 2,999,070 | 9/1961 | Rimbach | 252—301.4 |
| 3,002,933 | 10/1961 | Homer | 252—301.4 |
| 3,023,339 | 2/1962 | Vodokyls | 252—301.6 |
| 3,055,767 | 9/1962 | Quirk | 117—33.5 |
| 3,110,560 | 11/1963 | Ranby | 252—301.6 |

GEORGE N. WESTBY, *Primary Examiner.*

ARTHUR GAUSS, DAVID J. GALVIN, C. R. CAMPBELL, *Assistant Examiners.*